United States Patent

[11] 3,580,409

[72] Inventor Henry J. Soboleski
 1745 Kessler, South Bend, Ind. 46600
[21] Appl. No. 864,980
[22] Filed Oct. 9, 1969
[45] Patented May 25, 1971

[54] FRUIT AND VEGETABLE JAR SUPPRESSOR DEVICE
 9 Claims, 5 Drawing Figs.
[52] U.S. Cl. ................................................ 215/81
[51] Int. Cl. ........................................ B65d 51/14
[50] Field of Search .......................................... 215/81

[56] References Cited
UNITED STATES PATENTS
3,075,667  1/1963  Lind ............................. 215/81

FOREIGN PATENTS
553,140  2/1958  Canada ........................ 215/81

Primary Examiner—Samuel F. Coleman
Assistant Examiner—Norman L. Stack, Jr.
Attorneys—Hobbs and Green and Kemon, Palmer and Estabrook ABSTRACT: A fruit and vegetable jar suppressor device of a one-piece cup-shaped body construction having sidewalls which taper inwardly and downwardly and having a bottom joined integrally to the lower edge of the sidewalls. The bottom preferably is concave upwardly and contains a center hole for the admission of liquid in the fruit of vegetable jar into the device while suppressing the fruit and vegetable solid material in the jar. The cup-shaped body is of flexible plastic material capable of adapting itself to jars with variations in the diameter of the opening.

PATENTED MAY 25 1971

*INVENTOR.*
HENRY J. SOBOLESKI
BY Hobbs & Green
ATTORNEYS

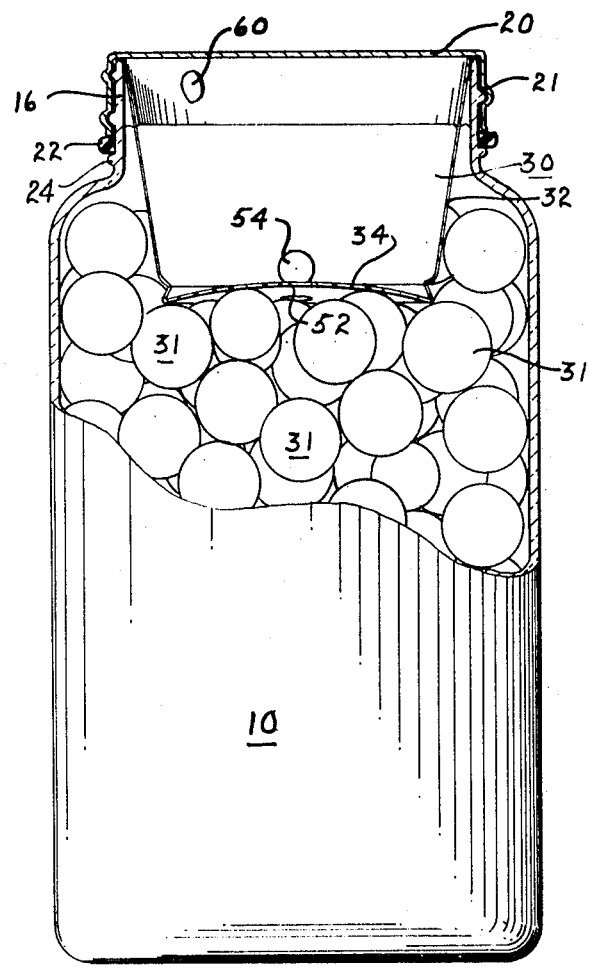

FRUIT AND VEGETABLE JAR SUPPRESSOR DEVICE

In the conventional manner of canning fruit and vegetables, the fruit or vegetable is cooked in water or syrup and, while still near the boiling temperature of water, the fruit or vegetable is packed into a hot sterilized jar and the jar then is filled substantially full with the cooking water or syrup. While the jar and contents are still hot, a lid is screwed onto the jar and sealed in place when the lid seats onto a sealing ring. In most instances, the fruit or vegetables are of less density than the cooking water or syrup contained in the jar, and as a result, the fruit or vegetables rise to the top and often project above the level of the liquid in the jar. Thereafter, during the time the jar is stored, some spoilage may occur as a result of a slightly defective seal between the lid and jar, or as the result of lack of due care during the canning operation. This spoilage occurs, at least initially, at the top directly beneath the lid, and particularly in and on the fruit or vegetable not immersed in the water or syrup, while the solid material submerged in the liquid often remains unspoiled and edible. Attempts have been made in the past to overcome the spoilage of the material at the top of the liquid by suppressing the solid material down away from the upper level of the liquid, but these suppressing devices have had a number of inherent disadvantages, including damage to the suppressed fruit or vegetable, excess cost and inconvenience in using the suppressors, and difficulty in inserting the suppressors in and/or removing them from the jar. It is therefore one of the principal objects of the present invention to provide a device adapted to easily be inserted in the top of a fruit or vegetable jar during the canning operation, which will suppress the solid material in the liquid and hold it beneath the liquid level indefinitely, with a minimum amount of injury to the fruit or vegetables in the jar, and which can readily be removed from the jar when the contents are to be used.

Another object of the invention is to provide a relatively simple and inexpensive solid material suppressor device for preventing spoilage resulting from not having the canned material fully covered by the juice or other liquid in the jar normally used in household canning practices, the device being flexible and easily adapted to jars without close tolerances, and being of a material which can be effectively sterilized along with the jars and lids and which will not react with or taint the food in the jar.

Still another object is to provide a fruit and vegetable jar suppressor device constructed as a one-piece plastic body which can be economically discarded after one use, or can be sterilized and reused over and over without being detrimental to the canned food.

Additional objects and advantages of the present invention will become apparent from the following description and accompanying drawings, wherein:

FIG. 4 is a partial cross-sectional view of the assembled fruit jar, suppressor, and lid illustrating the manner in which the suppressor performs the operation and protects the solid fruit or vegetables in the canning jar.

Figure 1:
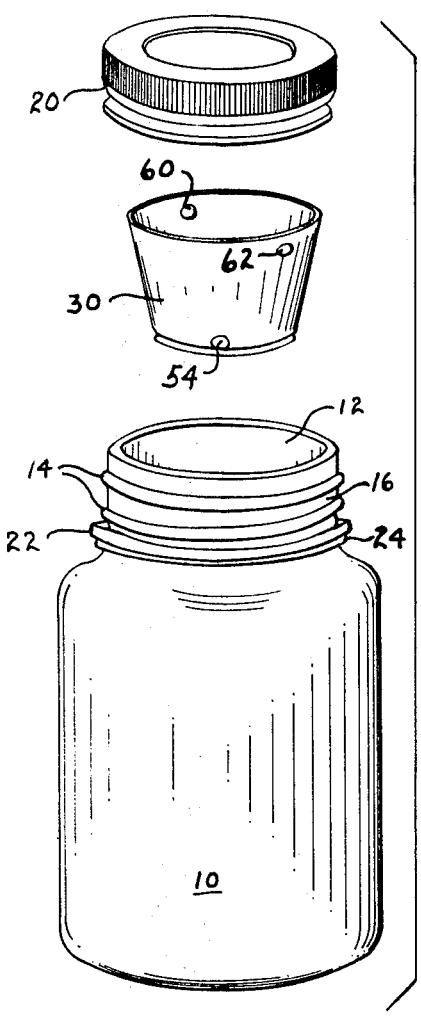
FIG. 1 is an exploded view of the parts of a fruit or vegetable canning jar including the lid and the present suppressor device.

Referring more specifically to the drawings and to FIG. 1 in particular, numeral 10 designates generally a glass fruit jar having an opening 12 and a threaded portion 14 on the external surface of neck 16 of the jar. The exact shape of the jar is not critical; however, normally the opening 12 is round and neck 16 is cylindrical and is somewhat smaller than the main portion of the jar. A lid 20 having screw threads 21 on the internal surface thereof for engaging screw threaded portion 14 is adapted to enclose the jar and to seat on seal 22 mounted on an annular rib 24 near the bottom of neck 16. The suppressor 30 is adapted to seat in the opening 12 and to suppress the solid material 31 in the jar in the manner illustrated in FIG. 4.

The suppressor consists of a body 32 having a generally cylindrical-shaped configuration, preferably tapering inwardly and downwardly from the top to near the bottom. The lower end of the body is enclosed by bottom member 34 connected to the lower edge of the body by a flange 36 formed integrally with and constituting a part of body 32. The bottom 34 is in a slightly concave position, as indicated by broken line 38, thus giving greater resiliency to the bottom so that it may yield when pressed firmly against the solid material in the jar. The upper marginal portion 40 of the suppressor device preferably seats rather closely along the internal wall of neck 16; however, a snug fit is not required.

Figure 5:
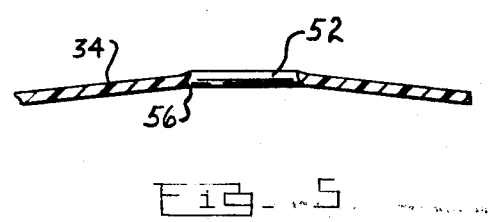
FIG. 5 is an enlarged fragmentary cross-sectional view taken on line 5-5 of FIG. 3.
Figure 2:
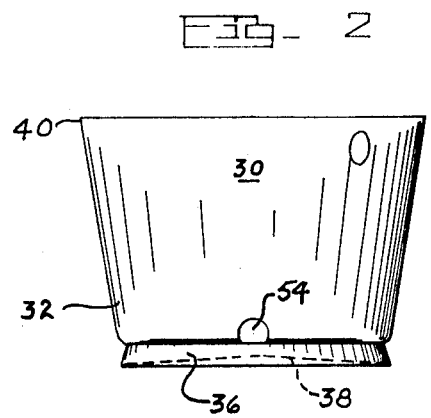
FIG. 2 is a side elevational view of the food suppressor device shown in FIG. 1.
Figure 3:
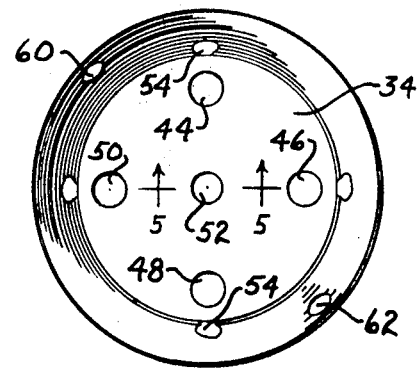
FIG. 3 is a bottom view of the device shown in FIG. 2.

In order to permit the liquid in the jar to rise and enter the suppressor device when the device is inserted in the jar, a plurality of peripheral holes 44, 46, 48 and 50 and center hole 52 are provided in bottom 34. One or more additional holes 54 may also be provided in the body 32, preferably near the bottom thereof. These latter holes likewise are intended to permit the liquid in the bottle to readily flow into the suppressor device. The foregoing holes are preferably rounded along the external edge thereof in order to provide a smooth outer corner 56 which the fruit and vegetable material may contact without causing any injury to the material. The protective curvature of these holes is illustrated in FIG. 5 which is an enlarged fragmentary cross-sectional view of hole 52. Holes 60 and 62 are positioned near the top of the device to provide a means for assisting in removing the suppressor device from the jar when the jar is opened. A tool, instrument or utensil, such as the tines of a fork, may be inserted in holes 60 and 62 to lift the device from the jar.

In order to make the device particularly versatile with respect to different types of fruit and vegetable jars, as well as permit it to be used effectively in jars not having a close tolerance, the device is constructed of flexible material. The flexible material likewise has a particular advantage in yielding slightly to the resistance of the solid material in the jar, thus minimizing bruising or other injury to the fruit or vegetables in the jar. The device is preferably constructed of plastic material, such as polyethylene, and has a sufficiently thin wall and bottom structure to flex readily when inserted in the jar. However, it is sufficiently rigid that it retains its general overall configuration, consisting of the generally cylindrical side walls and slightly concave bottom. The particular shape shown, including the downwardly and inwardly tapered sidewalls, permits the devices to be stacked for convenient handling.

In the use of the present fruit and vegetable jar suppressor device, the jar, suppressor, lid and seal are sterilized in boiling water and the hot fruit or vegetable is packed into the jar, leaving sufficient space above the solid material to permit the suppressor device to be inserted in the manner illustrated in FIG. 4. The water, juice, syrup or other liquid in which the fruit or vegetable was cooked is then added to the jar to the desired level, which is normally only slightly below the upper edge of opening 12. The suppressor device is then inserted in the neck 16, pressing the fruit or vegetable in the jar downwardly in the manner illustrated in FIG. 4. The seal 22 and lid 20 are then secured to neck 16 and the lid is tightened firmly against the seal to fully seal the jar. As the suppressor is placed in the jar, the fruit or vegetable is usually floating in the liquid, and hence must be pressed downwardly, and as the device is pressed inwardly and downwardly, the liquid flows through the holes in the bottom and sidewalls of the device to its normal level. Thus, the device prevents the solid material from floating to the top of the liquid and yet permits the liquid to substantially fill the jar. Any spoilage that otherwise would occur normally does not affect the fruit or vegetable in the jar, which is effectively protected by the liquid above the suppressed material.

The present suppressor device, being constructed of relatively inexpensive plastic, may be discarded after each use, or it may be used a number of times without any detrimental effect on the material in each jar. The device will hold its shape and perform the suppressing operation effectively for an extended period of time and in repeated operations without losing its effectiveness to properly hold the solid material downwardly away from the upper level of the liquid in the jar. The flexibility of the device permits it to yield sufficiently, as it is pressed inwardly and downwardly against the solid material, to prevent bruising or other injury to the solid material. Thus, the fruit or vegetable material remains in good condition throughout the storage period. When the contents are to be removed from the jar, the lid is removed and the suppressor device is easily lifted from the neck using holes 60 and 62 if necessary to raise it above the upper edge of the neck of the jar.

The present device is intended primarily for use as a suppressor; however, it may be used as a strainer, either by leaving the device in the neck of the jar after the lid has been removed and then pouring the liquid from the jar, or by removing the device from the jar and pouring a portion of the jar contents into the device held in its upright position. In either instance, the liquid flows freely through the holes while the solid material is retained by or in the device.

While only one embodiment of the present suppressor device has been described in detail, various changes and modifications may be made without departing from the scope of the invention.

I claim:

1. A fruit and vegetable jar suppressor device comprising a one-piece cup-shaped body having generally cylindrical sidewalls and a generally disc-shaped bottom member, said body being constructed of flexible plastic material, said device having a hole therein adjacent the bottom for permitting liquid in a jar to flow thereinto while preventing the fruit and vegetable material from rising to the top of the liquid, and said sidewalls being tapered inwardly and downwardly and joined integrally to the bottom member.

2. A fruit and vegetable jar suppressor device as defined in claim 1 in which said bottom member is concave upwardly and contains a hole near the center thereof.

3. A fruit and vegetable jar suppressor device as defined in claim 1 in which said one-piece cup-shaped body is constructed of polyethylene plastic material.

4. A fruit and vegetable jar suppressor device as defined in claim 1 in which said sidewalls contain a plurality of holes near the bottom thereof.

5. A fruit and vegetable jar suppressor device as defined in claim 1 in which said sidewalls contain a means near the upper edge thereof for assisting in removing the device from a fruit or vegetable jar.

6. A fruit and vegetable jar suppressor device as defined in claim 5 in which said means consist of a plurality of spaced holes.

7. A fruit and vegetable jar suppressor device as defined in claim 1 in which the outer peripheral edge of said hole is rounded to prevent bruising of any fruit or vegetable material contacting the area surrounding said hole.

8. A fruit and vegetable jar suppressor device as defined in claim 4 in which the outer peripheral edge of said hole is rounded to prevent bruising of any fruit or vegetable material contacting the area surrounding said hole.

9. A fruit and vegetable jar suppressor device as defined in claim 1 in which said one-piece cup-shaped body is of a thin plastic material, such that the peripheral margin thereof will readily adjust to variations in the tolerances to the opening of the jar.